US012427353B1

(12) United States Patent
Council et al.

(10) Patent No.: US 12,427,353 B1
(45) Date of Patent: Sep. 30, 2025

(54) INTELLIGENT FIRE SUPPRESSION SYSTEM AND METHOD

(71) Applicant: Dale Rodney Council, Sunnyvale, CA (US)

(72) Inventors: Dale Rodney Council, Sunnyvale, CA (US); William J. Volz, Sunnvyale, CA (US)

(*) Notice: Subject to any disclaimer, the term of this patent is extended or adjusted under 35 U.S.C. 154(b) by 155 days.

(21) Appl. No.: 18/102,057

(22) Filed: Jan. 26, 2023

Related U.S. Application Data

(63) Continuation of application No. 16/858,515, filed on Apr. 24, 2020, now abandoned.

(60) Provisional application No. 62/838,822, filed on Apr. 25, 2019.

(51) Int. Cl.
*A62C 37/40* (2006.01)
*A62C 3/02* (2006.01)
*G05B 13/02* (2006.01)

(52) U.S. Cl.
CPC ............ *A62C 37/40* (2013.01); *A62C 3/0214* (2013.01); *G05B 13/0265* (2013.01)

(58) Field of Classification Search
CPC ......... A62C 37/40; A62C 3/0214; A62C 3/02; G03B 13/0265; G08B 17/005; G08B 17/12; G08B 17/125; Y10S 706/913; Y10S 706/90
See application file for complete search history.

(56) References Cited

U.S. PATENT DOCUMENTS

| | | | | |
|---|---|---|---|---|
| 4,821,805 A | * | 4/1989 | Saito | A62C 37/00 169/61 |
| 5,125,458 A | * | 6/1992 | Berman | A62C 37/36 169/61 |
| 6,390,203 B1 | * | 5/2002 | Borisov | B05B 17/06 239/102.1 |
| 2016/0313120 A1 | * | 10/2016 | Shishalov | H04N 23/62 |
| 2017/0238157 A1 | | 8/2017 | Best | |
| 2018/0339180 A1 | | 11/2018 | Weber | |
| 2019/0054333 A1 | * | 2/2019 | McNamara | A62C 35/023 |
| 2019/0168035 A1 | * | 6/2019 | Conboy | A62C 37/50 |
| 2019/0168047 A1 | * | 6/2019 | Conboy | A62C 37/38 |
| 2020/0155881 A1 | * | 5/2020 | Tohidi | G06F 16/9038 |
| 2020/0226892 A1 | * | 7/2020 | Coles | G08B 5/38 |

* cited by examiner

*Primary Examiner* — Tuongminh N Pham
(74) *Attorney, Agent, or Firm* — ROARK IP

(57) ABSTRACT

A controller responds to an alert from a remote alert system and responds to an AI unit that detects a fire signature, and, in response, sends signals to fire suppression equipment to defend a structure against fire. A delivery device system may include delivery devices that are capable of spraying water and/or retardant at a structure or area to defend against fire. The system may act autonomously to defend against wildfires. The system includes a base station accessible by a user device to take control of the system. Alternatively, a central monitoring system may access the base station to control the system in addition to or instead of the user. In an embodiment, the system automatically sprays water or retardant prior to the outbreak of a fire. The system may optically detect embers landing on a structure or area being defended and sprays the embers with retard and/or water.

16 Claims, 9 Drawing Sheets

500 ⟶

Safe Home Product Flow Chart

PROBLEM: Unprotected Home in an Area Susceptible to Potential Fire Storms

502 — Home owner contacts authorized installer

Installer

504 —
- Surveys home
- Drafts plans
- Obtains permits
- Installs safe home controller, cameras, heat sensors and plumbing

Home Owner

506 — - Opens safe home monitoring account

Safe Home Staff

508 —
- Walks homeowner through setup procedures
- Performs full system test

510 — System activated in ready mode

FIG. 5

INTELLIGENT FIRE SUPPRESSION SYSTEM AND METHOD

CROSS REFERENCE TO RELATED APPLICATIONS

This Application claims benefit of U.S. patent application Ser. No. 16/858,515, filed on Apr. 24, 2020; which claims benefit of provisional patent application Ser. No. 62/838,822, filed Apr. 25, 2019. Both applications are incorporated herein in their entireties by this reference thereto.

TECHNICAL FIELD

This disclosure generally relates to fire suppression. More particularly, this disclosure relates to systems and methods for fire suppression.

BACKGROUND DISCUSSION

The challenge of protecting real estate and especially structures from wildfires has been met with various solutions for centuries but has primarily depended upon human intervention after being notified by neighbors or alarms. Whether a fire is started by electrical power or equipment malfunctions, lightning, carelessness, or other means, any given structure can be endangered by a fire that originated elsewhere and is approaching the given structure or generating embers that are blown toward the structure or its surrounding vegetation. In certain circumstances burning embers can travel 30 kilometers. The wildfires of the past decade have shown the difficulty of defending structures from such fires. In suburban and rural areas, it is difficult to clear adequately around many residences to the extent that would protect those structures from an approaching wildfire. The problem is exacerbated by the fact that many of these endangered structures are not occupied at the time of the threat because the residents are away at work or the area has been evacuated by authorities. Some protection systems have been devised that allow for some protection based on the type of delivery device technology that protects the interior of industrial buildings.

SUMMARY

A controller responds to an alert from a remote alert system and responds to an AI unit that detects a fire signature, and, in response, sends signals to fire suppression equipment to defend a structure against fire. A delivery device system may include delivery devices that are capable of spraying water and/or retardant at a structure or area to defend against fire. The system may act autonomously to defend against wildfires. The system includes a base station accessible by a user device to take control of the system. Alternatively, a central monitoring system may access the base station to control the system in addition to or instead of the user. In an embodiment, the system automatically sprays water or retardant prior to the outbreak of a fire. The system may optically detect embers landing on a structure or area being defended and sprays the embers with retard and/or water.

BRIEF DESCRIPTION OF THE DRAWINGS

In the following drawings, like reference numbers are used to refer to like elements. Although the following figures depict various examples of the fire suppression system, the system is not limited to the examples depicted in the figures.

FIG. 5 shows a flow diagram of a method of setting up the system;

DETAILED DESCRIPTION

A fire suppression system includes a controller that responds to an alert from a remote alert system and/or responds to a local sensor that senses fire. In response, the controller sends signals to fire suppression equipment to defend a structure against fire. A delivery system may include delivery devices capable of spraying water and/or flame retardant at the structure and/or area to defend against fire. An embodiment acts autonomously to defend against wildfires. An embodiment includes a base station accessible by a user device to take control of the system. A central monitoring system may access the base station in addition to, or instead of, the user, and can control the system through the base station. An embodiment automatically sprays water or flame retardant prior to outbreak of a fire. An embodiment optically detects embers landing on a structure or area being defended and sprays the embers with fire retardant and/or water.

The fire suppression system protects the exterior of a home or building prior to and while under threat of a wildfire. While indoor delivery systems protect structure interiors by deploying when local sensors detect existence of an internal fire, building exteriors pose greater difficulty since the area to be protected is much larger, threats are more difficult to assess, and the available resources must be used efficiently to be successful.

The system protects structures by employing combinations of visible light sensing, infrared spectrum sensing, machine vision, deep learning, radio communication, and robotic controls to pinpoint and eliminate outdoor fire danger at the earliest opportunity and over the largest defensible boundary.

The system is designed to create a defensible area around the structure intended to be protected. In an embodiment, the defensible area may be, for example 20' or 30' to 100'. In an embodiment, the system includes settings for adjusting to the size of the defensible area. In an embodiment, the system may automatically compute the size of the defensible area that will work best based on the available resource, such as power, water and/or other fire retardants, the estimated intensity of the fire, and the estimated duration of the fire.

Figure 1:
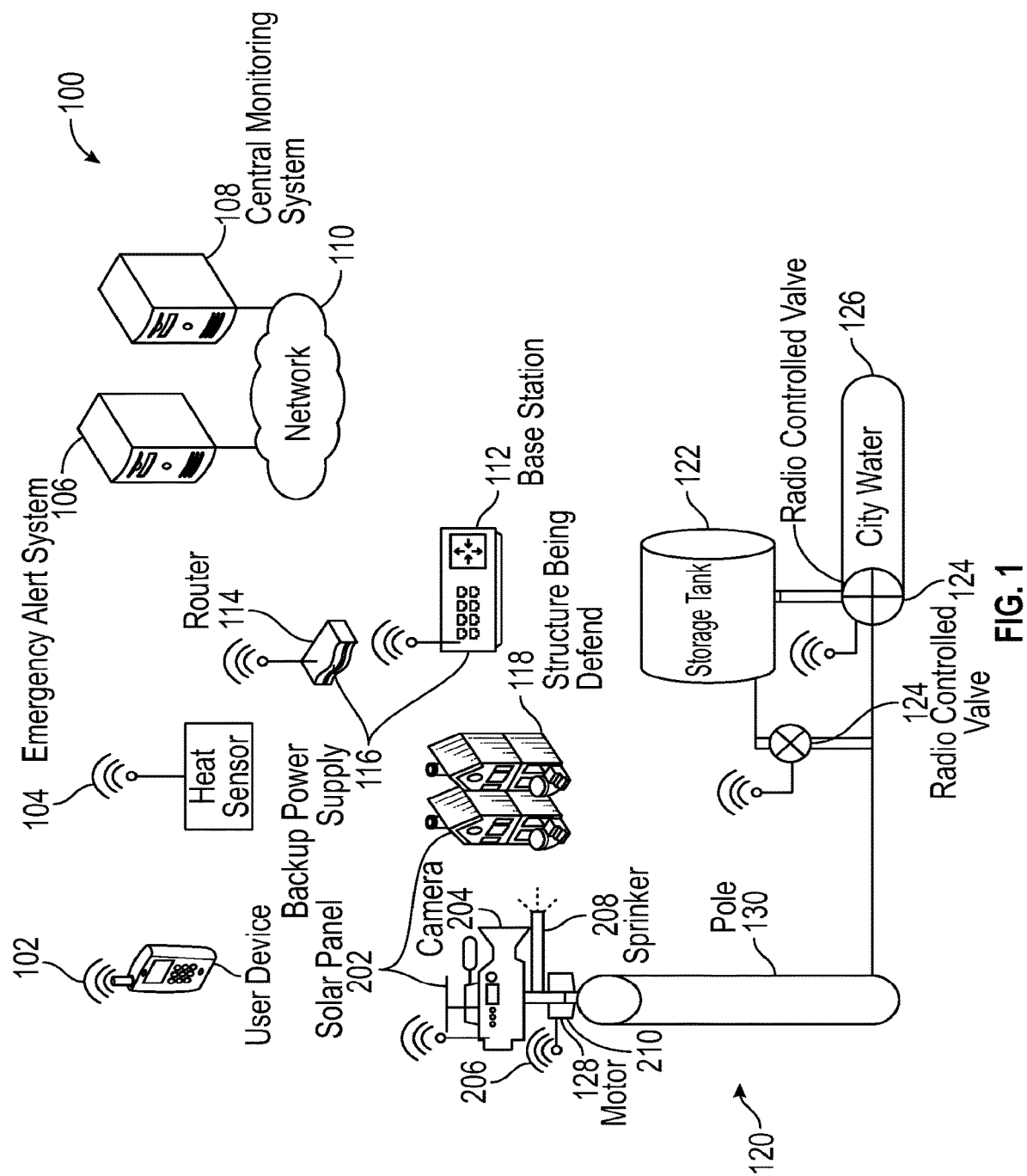
FIG. 1. shows an example of the fire suppression system.

FIG. 1 shows a representation an embodiment of the system 100.

As shown in the drawings, the fire suppression system 100 may include several components, such as a triggering system (base station) 112 that detects indications of a fire and triggers a response. A delivery system 120 may include delivery devices 208, piping, and/or other fittings that deliver water to the area being protected. The fire suppression system 100 may include a backup power supply 116 that powers the system in case of a power outage. No plumbing intrusions into the roof of structure are required and consequently it is likely that no special building permits would be required (depending on the jurisdiction and local laws and ordinances). The fire suppression system 100 may be installed during construction of a new structure (e.g., a new house or building) or retrofitted to an existing property.

The delivery devices 208 and plumbing are to be installed on (and/or under) the grounds where any licensed plumber or landscaper would be able to install the plumbing and delivery devices. An existing city water supply 126 may be used as the water supply. Optionally, where possible, there may be an above ground water tank 122 as a back-up water supply. Optionally, the delivery devices 208 may spray a fire retardant other than water. Optionally, the delivery devices 208 may be capable of spraying both water and another fire retardant and/or there may be some delivery devices that spray fire retardant and others that spray water. Optionally, the base station 112 may automatically determine whether to spray water or another fire retardant.

Additionally, or alternatively, there may be a central monitoring station 108 that may monitor multiple structures and which may be located remotely from the structure being defended 118.

In an embodiment, a Nationwide Wireless Emergency Alert system, or another alert system, 106 may activate the system. In an embodiment, once an SMS alert goes out (e.g., by the Nationwide Wireless Emergency Alert system) 106 the fire suppression system 100 is monitored by the central monitoring system 108 to confirm that the system is operational, to take preventative measures to protect against a fire starting, and/or to check for nearby fires. The system may be designed to operate autonomously and/or by the owner or manager (of the structure or area being protected) activating/deactivating (e.g., via a touch screen) on a control panel. Additionally, or alternatively, there may be a central monitoring station may be capable of turning on and off and operating the fire suppression system 100.

The fire suppression system 100 may include a controller 300 (which may include Short Message Service (SMS), Global Positioning System (GPS) and wireless component 114 communication), which may control the delivery devices 208 and/or communications with the user (e.g., the owner or manager of the structure or area being defended). In an embodiment, the SMS and GPS of the controller 300 work in conjunction with (or work primarily in conjunction with) the monitoring station 108.

The monitoring station 108 may have GPS equipment and/or may be mobile. The monitoring station 108 may have a database and/or an electronic map for correlating locations (e.g., as reported by first responders or as announced on a public broadcast system) to GPS coordinates of a threat. If there is a threat, the monitoring system 108 may query particular locations for GPS coordinate (or look up the GPS coordinates in a database) to determine, and then use the GPS coordinate of the location (and optionally GPS coordinates of the threat (if available) to compute how close the threat is to a given location and/or for confirmations in relationship to a threat, to aid monitoring staff in determining where to activate systems ready check procedures.

Optionally, at the time of installation, the GPS of each site having a controller 300 could be determined and recorded in a database at the monitoring station 108.

The fire suppression system 100 may include high definition cameras 204, which may detect a fire and/or provide a view of the area, which may be transmitted to the user 102, local fire department, and/or a central monitoring station 108.

The fire suppression system 100 may include two-way communications which may provide communications between the user 102, the central monitoring station 108, and/or the base station 112 (or other devices protecting against fire). In embodiments, the various components of the system may be communicatively coupled with each other via a network connection 110. In embodiments, the system components may exchange information with each other via a router 114.

The fire suppression system 100 may include one or more exterior heat sensors 104 for detecting heat from a fire located exterior to the structure being defended 118. Optionally, there may also be one or more heat sensors 100 and/or smoke sensors for detecting fire located on, in, and/or around the structure or area being defended. Optionally, a positioning sensor grid system 708 may be used to map the surface of the roof of a structure being defended 118. The map of the surface of the roof may be computer generated and/or may be generated by a mechanical device (or an optical device and/or electronic device) taking measurement of distances and elevations of various locations and/or structures on the roof.

The fire suppression system 100 may include multiple delivery devices 208, which optionally may be aimed at the structure being defended 118 and/or the surrounding area, so as to keep the structure being defended 118 and/or the surrounding area may be kept moist with water and/or fire retardant may be applied. The fire suppression system 100 may include a backup water tank 122 for supplying water to the delivery system in case water ceases to come from the city water system 126 (e.g., as a result of fire fighters diverting the water to another area).

The fire suppression system 100 may include water plumbing to bring the water from the city water pipes 126 to the delivery device 208 and the backup water tank 122 and from the backup water tank 122 to the delivery device 208. The fire suppression system 100 may include pumps, auxiliary pumps and/or one or more pressurized delivery systems for both pumping the water if there is insufficient pressure in the water system, as well as delivering short bursts of water/retardant to a specific location or region of the protected area. The fire suppression system 100 may include an Uninterruptable Power Supply (UPS), or other power supply, as a power backup to supplying power to the control center, heat sensors, and/or pumps. For example, the fire suppression system 100 may have solar cells 202, which optionally may charge a battery as a backup power source and/or may power some or all of the components of the fire suppression system 100 directly.

In an embodiment, once an "Imminent Threat" alert is sent (e.g., by the Nationwide Wireless Emergency Alert system 106) the fire suppression system 100 arms itself, and may trigger a system test and/or take a first defensive measure, the delivery devices may be turned on for a 120 second span of time to start the first round of defense. In other embodiments, the amount of time that the delivery device is turned on may be different, and may depend on how fast the delivery system can wet the area and/or structure being defended 118, which may depend on the water pressure, the number of delivery devices 208, and/or the expected likelihood of a need to conserve water (which may depend on the health of the city water system 126 and/or how full the backup water tank 122 is. In an embodiment, the system may next reset to "stand-by/ready mode" and repeat another round of defense test at regular intervals of, for example 15 minutes. How frequently the delivery devices turn on may depend on how much water was delivered to the area or structure being defended, the amount of humidity in the air, whether or not there is precipitation, and/or the temperature, how imminent the fire appears to be. If there are no further alerts the system suspends the treatment and moves back to a stand-by mode. The repetition of the defensive round may be suspended or canceled by property owner at any time.

In the event of a fast-moving fire, heat sensors 104 activate a continuous suppression mode until the threat is eliminated. If the city water supply 126 becomes disabled the system automatically switches supply source to the water tank 122 and moves to a conservation mode. Additionally, or alternatively, the system may syphon water from a nearby pool or natural water source. There may also be Closed Circuit Television (CCTV) cameras located around the protected property to be monitored by the monitoring station 108 as well as by homeowner, via a smart phone application 102, for example.

Some programming features are as follows:

The fire suppression system may include an intelligent device (e.g., a controller, console, base stations, and/or computer), which may have the ability to receive National EAS and WEA alerts;

The intelligent device may have the ability to understand the alert content (of the National EAS alerts, WEA alerts, and/or alerts from the central monitoring system, for example) and determine relevance of the alert depending on the location of the structure being defended, the location of the of the current fire (which may be indicated in the alert) and/or the location of the device sending the alert. The intelligent device may include have GPS/GEO awareness (e.g., may include a databased of locations and distances to the location being defended, so as to determine the mode of operation to engage in, based on a likelihood that the fire will arrive and how soon the fire is likely to arrive. For example, based on the message received, it may be possible to compute an estimate of the distance between the fire and the structure or area being defended and it may also be possible to compute a possible estimated time of arrival of the fire. Based on the computations, appropriate actions may be taken and/or degree of readiness may be set;

The intelligent device may have the ability to be accessed remotely, by the user and/or the central monitoring station, thereby allowing viewing of the structure and area being defended and may allow the intelligent device (the base station) to be controlled remotely by the central monitoring station (and/or the intelligent device may simply be monitored by the central monitoring station);

The intelligent device may automatically dial 911, may provide an icon and/or tool (e.g., a button on a Graphical User Interface (GUI) or a page of an application), so that the homeowner can directly and easily dial 911, and/or may provide an icon and/or too for the monitoring center to dial 911. Optionally, the coding runs on a Windows Operating System or a Linux platform. The system may run completely autonomously. After an initial alert is received, the system may wet the entire protected area. In an embodiment, the system utilizes PTZ (pan tilt zoom) cameras 136 having IR technology to identify potential embers on a protected roof and may target the problem spot, specifically. The PTZ cameras 204, may use 2 or 3 or 4 poles 130, optionally mounted, for example, at +/−15' from the ground. In embodiments, the ground-mounted poles 130 may be set a number of feet away the protected structure. the coding runs on a Windows Operating System or a Linux platform. The system will run completely autonomously. After an initial alert is received, the system may wet the entire protected area. In an embodiment, the system will utilize PTZ (pan tilt zoom) cameras with IR (infrared) technology 136 to identify potential embers on a protected roof and may target the problem spot, specifically. The PTZ cameras 204, may use as little as 2, 3 to 4 poles 130, optionally mounted, for example, at +/−15' from the ground. In embodiments, the ground-mounted poles 130 may be set a number of feet away the protected structure. In embodiments, a camera may operate as a surface-placed device. Although not shown, there may be delivery devices 208 mounted near the ground or at other locations that are able to better target places that are covered by awnings, canopies, or other coverings. A camera 206 may be mounted on top of each pole 130. A high-pressure water and/or other fire retardant targeting nozzle 208 may be used for putting out embers on the roof (or elsewhere) and a small solar panel 202 may be included to maintain battery power (in addition to or instead of the UPS (uninterruptable power supply). The fire suppression system 100 may also include an LED area light. All peripherals may be designed with wireless connectivity to the system base station (which may be the intelligent device.

Figure 2:
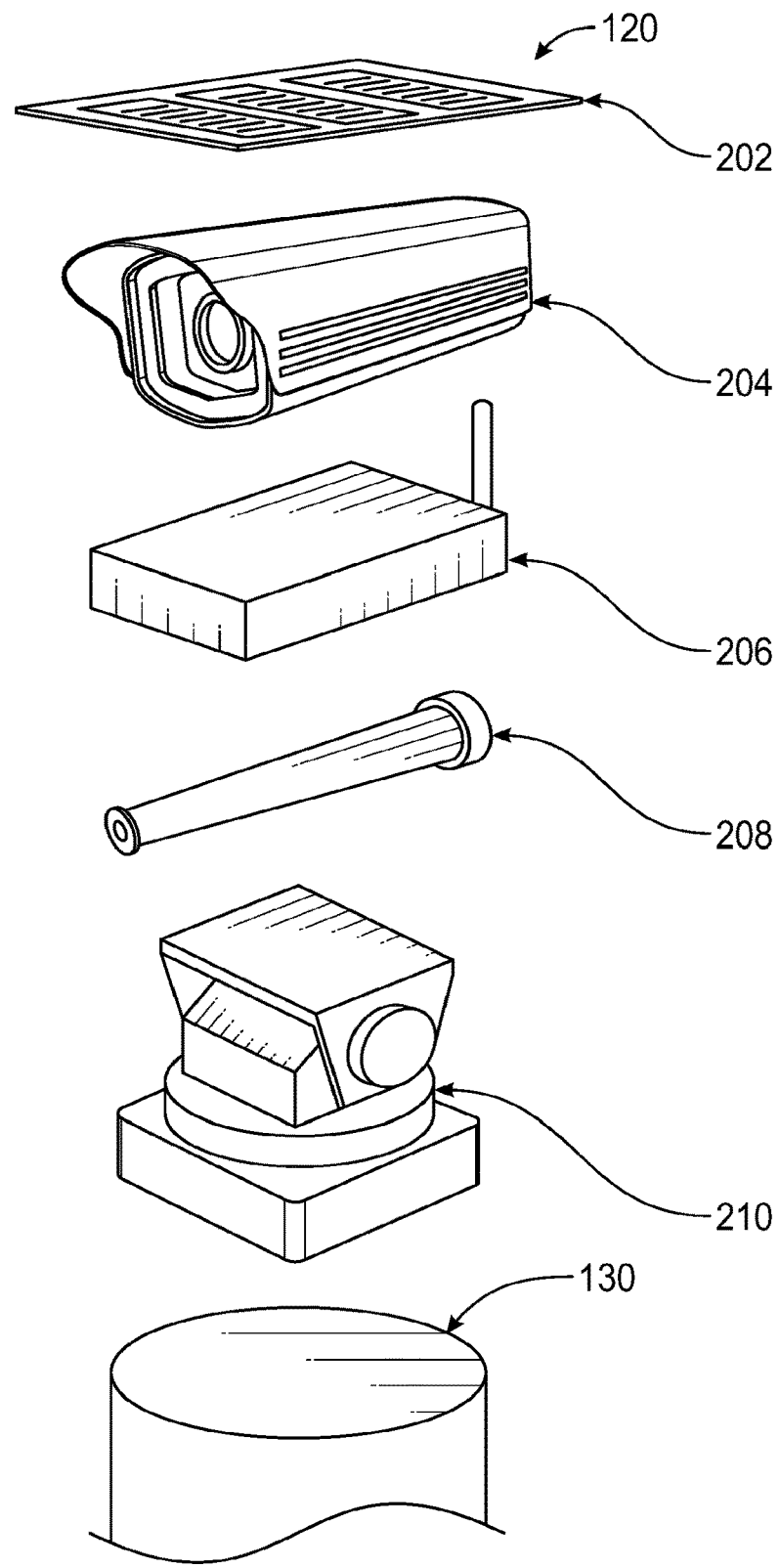
FIG. 2 shows an exemplary diagram of a camera and nozzle unit that may be used in the system of FIGS. 7A-C.
Figure 7A:
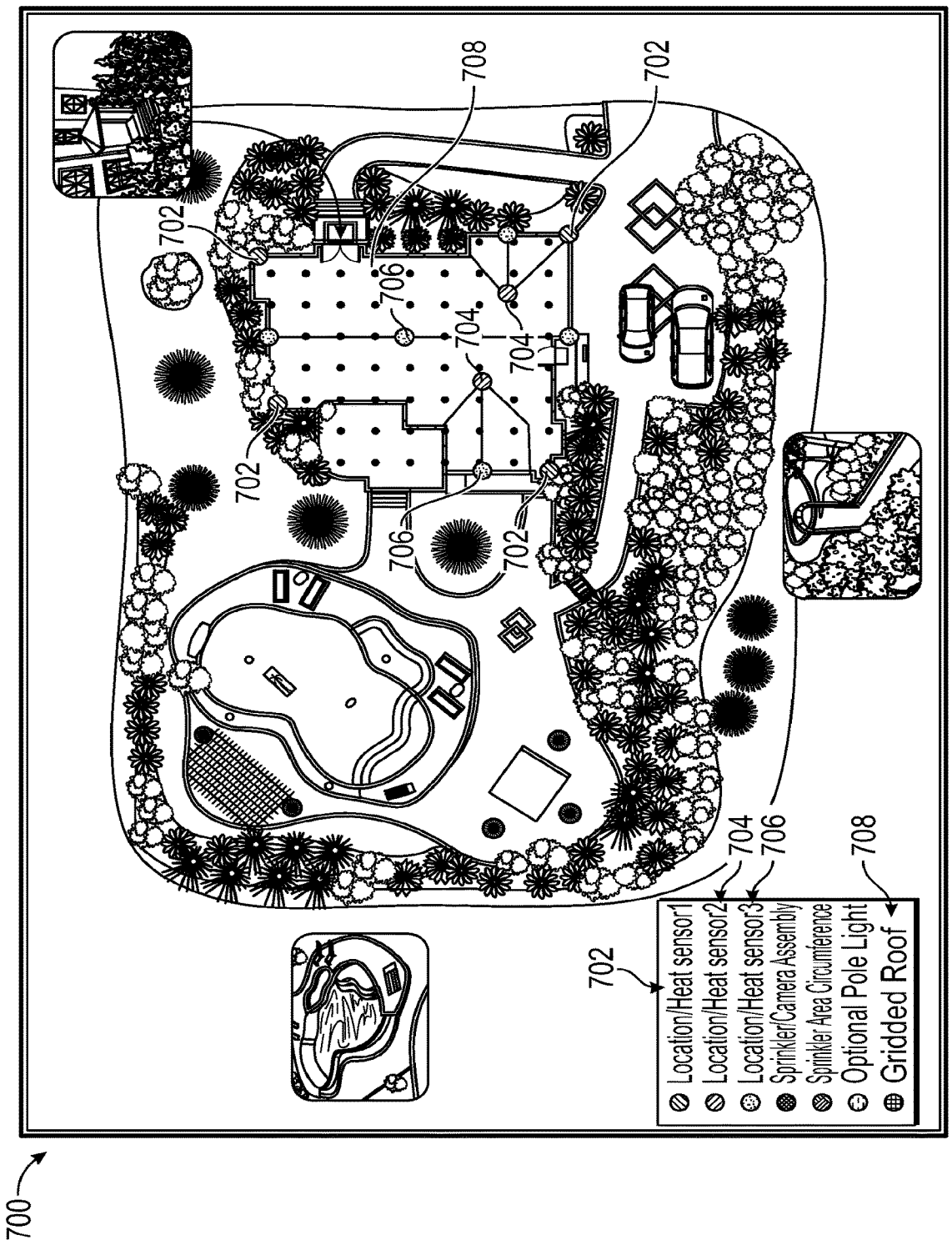
FIG. 7A shows an exemplary diagram of a site of a structure to be defended from a threat.
Figure 7B:
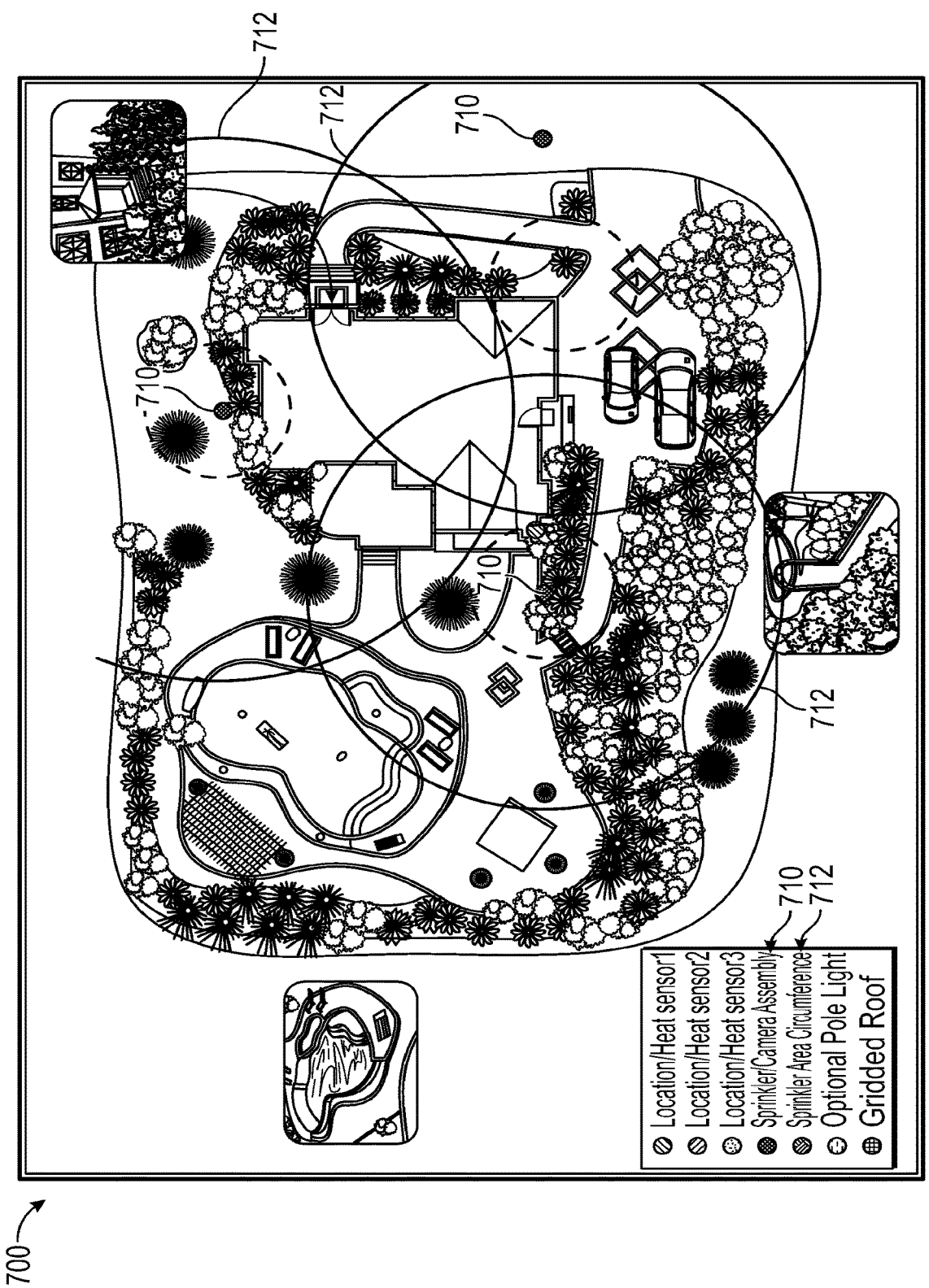
FIG. 7B shows an exemplary diagram of a site of a structure to be defended from a threat indicating where roof sensors may be placed.
Figure 7C:
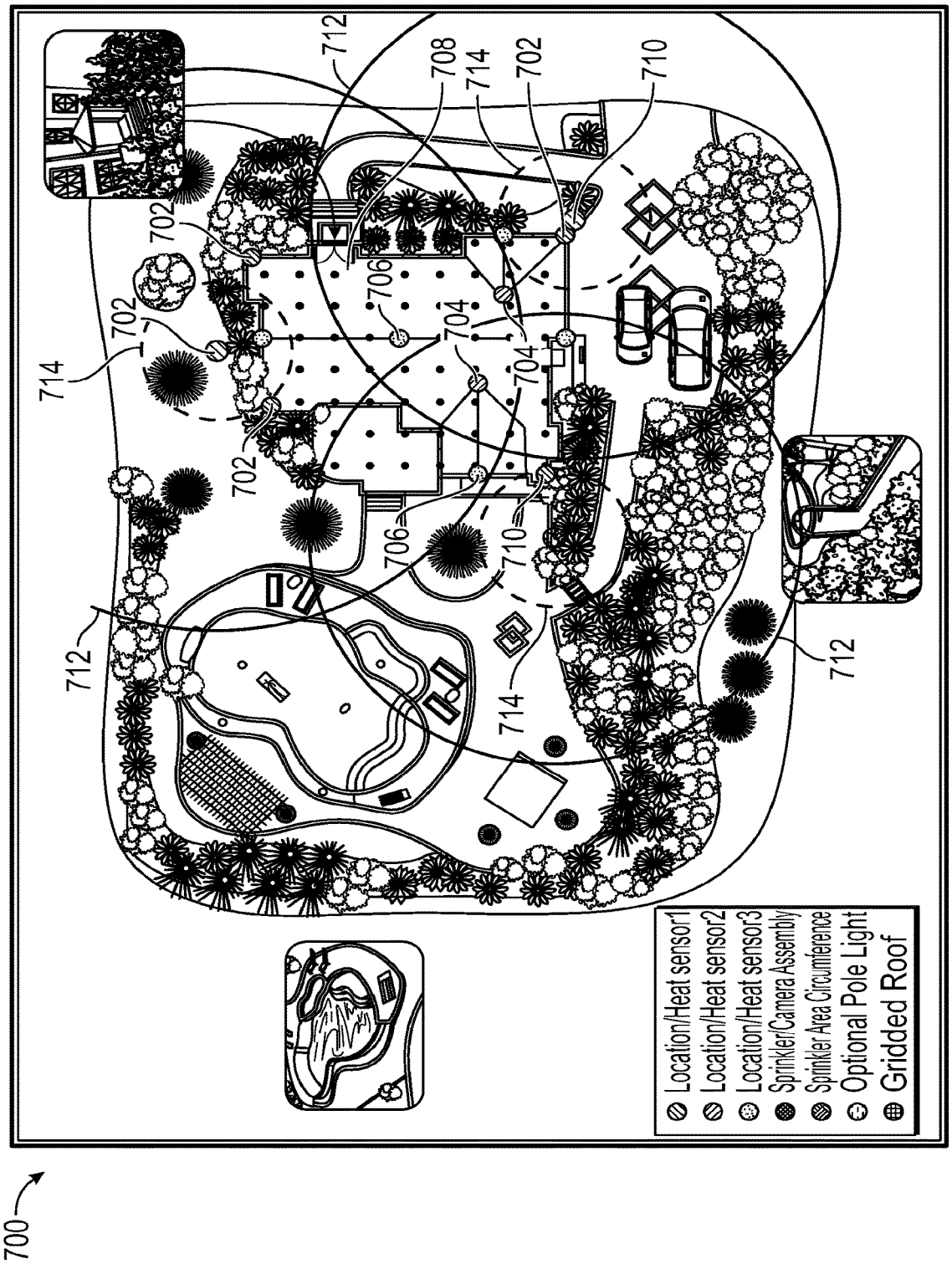
FIG. 7C shows and exemplary diagram of a site of a structure to be defended from a threat indicating where poles for mounting cameras and lighting may be placed.

FIG. 2 shows an exploded view of the camera and nozzle unit 120 of FIG. 1, which may be used as shown in FIGS. 7A-C. FIG. 2 shows an example of a camera and nozzle unit that may be used in the system of FIGS. 7A-C. As shown in FIGS. 1 and 2 the camera and nozzle unit 120 may include a pole 130, upon which is mounted a delivery device 208 with one or more pan-tilt motors 210. The device 120 is to be mounted upon the top of a lamp pole 130. Attached to that device is a visual/infrared camera to protect the property. The device 120 includes a small solar panel 202 to maintain the 12V battery backup system in the event of power outage. That pole may include a low voltage LED area light. The motor 210 gives the nozzle unit 120 the capability of rotating on the pole 130, thereby allowing the nozzle 208 to freely change the direction in which that water is sprayed, and also changing the direction in which the camera 204 is pointed. In embodiments, the camera 204 may be one or both of a high definition (HD) and a thermal camera. Power may be supplied to the motor 210 and/or the camera 204 from a solar panel 202 that may be mounted on the camera 208, as shown in FIGS. 1 and 2. In embodiments, there may be solar panels located elsewhere in addition to or instead of the solar panels 202 on top of the cameras 204. As indicated, the nozzle 208 and camera 204 may be capable of rotating on the pole, allowing the nozzle to change the direction that the water is sprayed and change the direction that the camera points. In embodiments, the system includes a proprietary AI (artificial intelligence) image recombination platform that identifies visual and heat signatures outside of what normal should be. Thus, the system can see and look at a maple leaf in fall, falling upon the roof of the structure to be protected. The system analyzes an image of the leaf to see it is of the right color. However, it there is no heat signature to identify the falling leaf as a threat. In this case, the system does nothing. In an alternate scenario, with or without a SMS alert, a burning ember lands on the roof of the structure to be protected, the system identifies a heat signature and identifies a threat, reacts and mitigates.

In embodiments, the nozzle 208 may be capable of adjusting the width of the spray so that the base station 112 (or user and/or monitoring system) can choose between providing a targeted spray (e.g., to put out an ember) and providing a wide area spray to quickly cover the structure and/or area being defended with a fire retardant (or water). Optionally, a swimming pool may automatically be used as an auxiliary source of water if the municipal water 126 cannot be supplied, and/or if the above ground water tank 122 empties. Although three poles, cameras, and nozzles are shown in FIGS. 7A-C, in other embodiments, there may be another number of delivery devices, cameras and/or poles.

Figure 3:
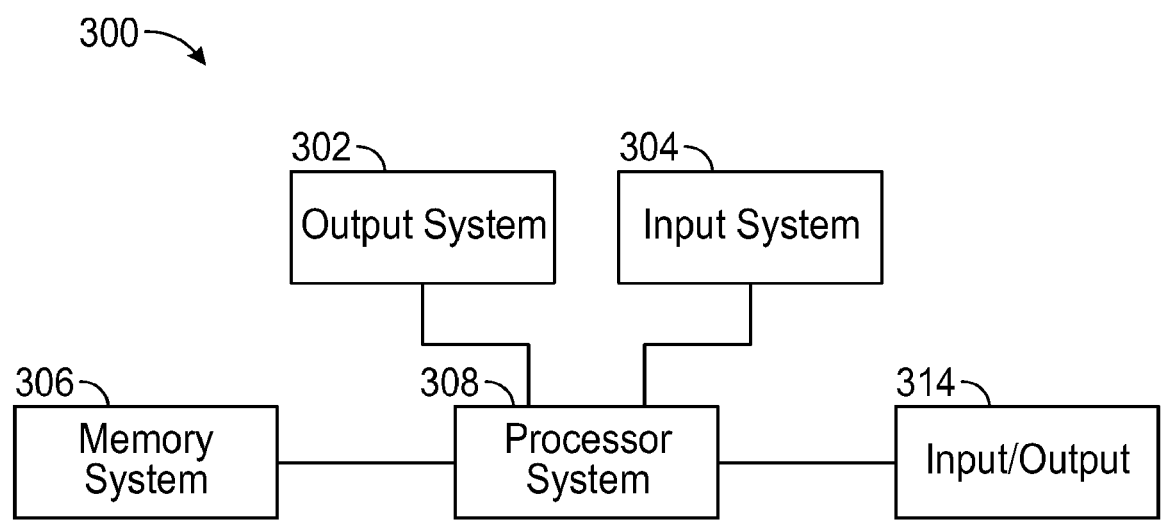
FIG. 3 shows an example of a base station of the fire suppression system.

FIG. 3 shows an example of base station 112 of the fire suppression system 100 in the form of a controller 300, which may be used in the fire suppression system 100 as a base station 112. The controller 300 may include output system 302, input system 304, memory system 306, processor system 308, and input/output device 314.

Controller 300 is an example of the intelligent device that may be used for fire suppression system 100 and/or for the central monitoring system 108. Controller 300 may be connected to a valve and/or pump that opens water to turn on a delivery device and/or to change the water source from the city water 126 to the backup water tank 122 in response to a communication from the central monitoring center 108, a user device 102, and/or a message from a public alert system 106.

Output system 302 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 302 may send messages to the central monitoring system and/or user. Output system 302 may send signals to open and/or close valves for turning on sprinkles and/or changing the water source from the city water to the backup water tank.

Input system 304 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 304 may receive public alerts, messages from a user device, and/or the central monitoring system.

Memory system 306 may include, for example, any one of, some of, any combination of, or all of a long-term storage system, such as a hard drive; a short-term storage system, such as random access memory; a removable storage system, such as a floppy drive or a removable drive; and/or flash memory. Memory system 306 may include one or more machine-readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes mediums that carry information while the information that is in transit from one location to another, such as copper wire and/or optical fiber. Memory system may store one or more machine instructions that cause controller 300 to take action in response to indications of a fire or an alert, signals from the sensors, messages from the user, and/or messages from the central monitoring system.

Processor system 308 may include any one of, some of, any combination of, or all of multiple parallel processors, a single processor, a system of processors having one or more central processors and/or one or more specialized processors dedicated to specific tasks. Also, processor system 308 may include one or more Digital Signal Processors (DSPs) in addition to or in place of one or more Central Processing Units (CPUs) and/or may have one or more digital signal processing programs that run on one or more CPU. Processor system 312 may implement the machine instructions stored in memory system 306.

Processor system 308 is communicatively linked to output system 302, input system 304, memory system 306, and/or input/output system 314. Information may be passed, via processor system 508, from any of output system 302, input system 304, memory system 306, and/or input/output system 314 to another of output system 302, input system 304, memory system 306, and/or input/output system 314. Processor system 308 may be linked to output system 302, input system 304, memory system 306, and/or input/output system 314 by any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves. In other embodiments, information may be shared between output system 502, input system 304, memory system 306, and/or input/output system 314 without participation of the processor system 308.

Input/output system 314 may include devices that have the dual function as input and output devices. For example, input/output system 314 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 314 is optional, and may be used in addition to or in place of output system 302 and/or input device 304.

Figure 4:
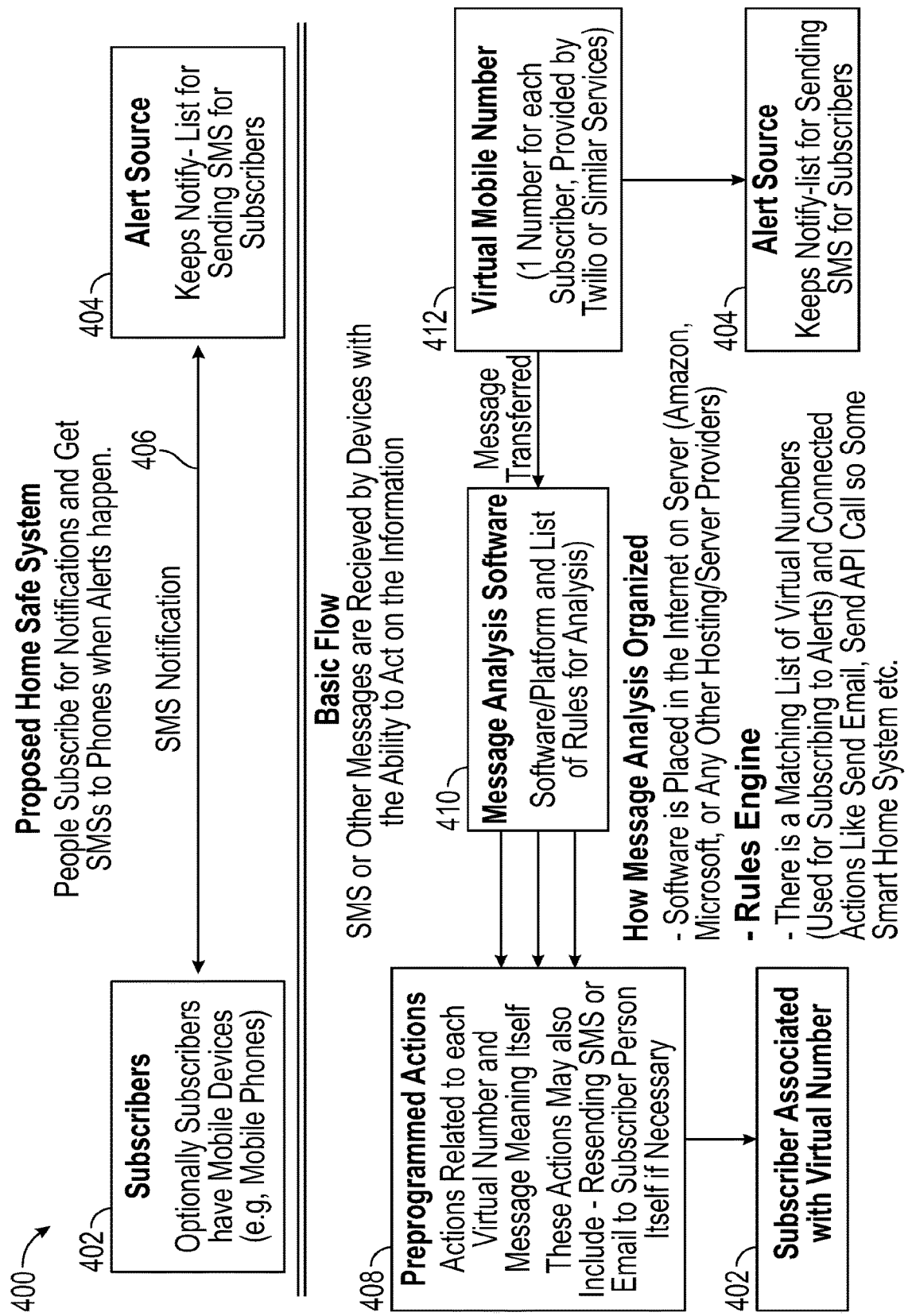
FIG. 4 shows a block diagram of an exemplary architecture of the fire suppression system.

FIG. 4 shows a block diagram of the architecture 400 of an embodiment of the fire suppression system. As shown, users 402 subscribe to the service for notification and receive alerts in the form of SMS messages from an alert source 404 that maintains a notification list.

As above, the alert source 404 maintains a notification list composed of mobile numbers 412, each number corresponding to a subscriber 402. Messages are transferred and received by a message-analysis platform 410 that performs a rules-based analysis of message content. A module 408 takes actions based on the subscriber and the message meaning itself. Actions may include resending the SMS message of emailing the subscriber. Message analysis is organized by the rules 410 and forwarded to subscribers at virtual numbers used for subscribing to alerts and connected actions such as send email or API call to some home-based security system.

FIG. 5 shows a flow diagram of a method 500 of setting up the system to which a user has subscribed to solve the problem of an unprotected home in an area susceptible to potential wildfires. The method 500 may include one or more of the following steps:

A homeowner contacts an authorized installer 502;
the installer: surveys the home, drafts plans, obtains permits, installs the controller, cameras, heat sensors, and plumbing 504;
the homeowner opens a monitoring account 506;
the service provider walks the homeowner through setup procedures and performs a full system test 508; and
the system is activated in READY mode.

Figure 6:
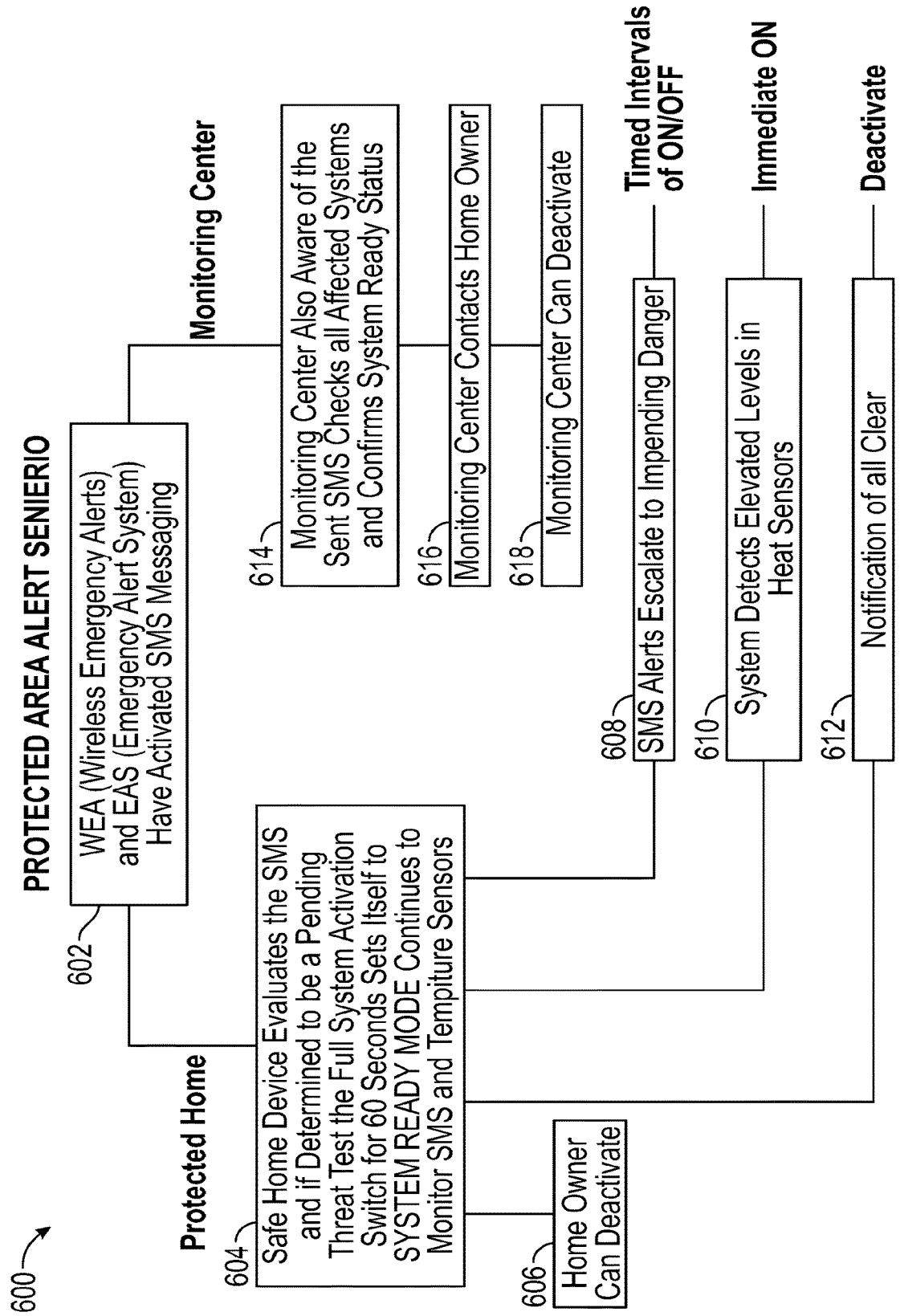
FIG. 6 shows a flow diagram of a method in which the system operates.

FIG. 6 shows a flow diagram of a method 600 in which the system operates:

Wireless Emergency Alerts (WEA) and/or Emergency Alert System (EAS) activate SMS messaging 602;
Protected home:
The system 100 evaluates the SMS and if determined to be a pending threat tests the full system activation switch, sets itself to fully system READY mode, continues to monitor SMS and temperature sensors 604;
Homeowner can deactivate 606;
SMS alerts escalate to impending danger at timed intervals of ON/OFF 608
System detects elevated levels in heat sensors—IMMEDIATE ON 610;
Notification of ALL CLEAR 612;
Monitoring Center;
Monitoring center checks all affected systems and confirms system READY status 614;
Monitoring Center contacts homeowner 616; and
Monitoring Center can deactivate 618.

In embodiments, the system 100 is available as a stand-alone device purchased from a local retailer.

FIGS. 7B and 7C show an example of a diagram of a site of a structure to be defended from a threat indicating where poles for mounting cameras and lighting may be placed 710. Each dot represents a pole for mounting a camera. The inner ring 714 surrounding each pole are locations where it may be desirable to place lights and delivery devices, which may be helpful in defending the structure in the dark, to aid in seeing the structure. Lights may optionally also be located on the cameras. In FIGS. 7C and D, the structure being defended 118 is a residence. Surrounding the structure are three dots, and each dot is surrounded by two concentric circles. Each dot represents a delivery device 710 defending the structure, and the outer circle 712 concentric to any given dot represents the full range of the delivery device. The outer circles of the dots 712 overlap one another and overlap the residence, which indicates that some of the residence is within the range of either of two of the three delivery devices, so as to ensure that all of the residence is within range of the at least one delivery device. The outer circles 712 representing the range of the delivery devices indicate the full area surrounding the structure being defended that may be protected as a defensible area to maximize the zone of protection for the structure. Each of the delivery devices may be mounted with a camera and a solar panel as shown in FIGS. 1 and 2.

In embodiments, the pole 130 is high enough so that the camera 204 can capture a visual image of the roof so as to detect embers or burning ashes landing the roof. The poles may also be high enough to have a visual image of the horizon, so as to detect a fire in the distance Alternatives and Extensions Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invented system. In addition, modifications may be made without departing from the essential teachings of the invention.

The invention claimed is:

1. A mobile fire suppression system that is capable of being deployed for a protected area that acts autonomously comprising:
a motorized delivery device having a visual and thermal camera and a nozzle capable of adjusting between a targeted spray and a wide spray, wherein the motorized delivery device is capable of rotating and tilting;
the motorized delivery device located in proximity to an exterior of the protected area capable of delivering fire retardant and water in predetermined amounts; and
a controller capable of:
using machine learning based artificial intelligence to detect visual images and heat signatures of the fire;
identifying and sending signals activating the fire suppression system in response to a detected path of the fire;
computing size of a defensible area based on estimated intensity of the fire, estimated duration of the fire and availability of resources for suppression of the fire;
turning on the fire suppression system for at least one round of defense wherein the fire retardant or water is delivered in bursts; and
determining if the fire retardant or water is exhausted and, if so, switching to a backup fire retardant or water supply and operating in a conservation mode.

2. The system of claim 1,
wherein the motorized delivery device exterior to a structure having the delivery device aimed at the structure or an area being defended.

3. The system of claim 1, further comprising
an early warning alert system that notifies authorities programmed into the motorized delivery device;
a central monitoring system located remotely from the structure; and
a smart phone for remote controlling the fire suppression system and viewing the structure to be protected.

4. The system of claim 1, further comprising a monitoring station remotely located from the structure for early warning notification to authorities.

5. The system of claim 1, wherein the motorized delivery device further comprises an alarm module for sounding an alarm when the visual and thermal camera detect the fire.

6. The system of claim 1, wherein the fire suppression system is capable of determining whether a burning ember on a surface of the structure or the area to be protected is a threat that can evolve into a fire and, if so, directing the motorized delivery device to deploy to an area of the threat.

7. The system of claim 6, further comprising an image capture for optically detecting one of said burning ember and a distant fire.

8. The system of claim 1, further comprising plumbing connecting a motorized delivery water supply device.

9. The system of claim 1, wherein said resources for suppression of the fire include: available power, water and fire retardants.

10. The system of claim 1, the controller further capable of:
   correlating a GPS location of the controller to GPS coordinates of the fire to compute how close the fire is the GPS location to determine where to activate the fire suppression system and relay that location to fire authorities.

11. The system of claim 1, wherein the visual and thermal camera includes a pan-tilt-zoom feature capable of identifying embers on a roof of the structure and targeting the embers.

12. The system of claim 1, wherein the controller is further capable of:
   upon receiving an alert, taking a first defensive measure to turn on the fire suppression system for a predetermined time period for a first round of defense, entering a stand-by mode, and repeating for a plurality of rounds of defense; and wherein the predetermined time depends on how fast the motorized delivery device can wet the area, water pressure of the motorized delivery device or the expected likelihood of a need to conserve water.

13. The system of claim 12, wherein a number of the plurality of rounds of defense depend on how much water was delivered to the area, an amount of humidity in the air, whether there is precipitation, temperature, or how imminent the fire appears to be.

14. The system of claim 1, wherein the controller is further capable of:
   upon sensing the fire is moving, activating a continuous suppression mode to insure the defensive area is secure or until the fire is eliminated.

15. The system of claim 1, wherein the controller is further capable of:
   upon disablement of a city water supply, automatically switching a water supply source to a water tank and entering conservation mode by signaling a valve.

16. The system of claim 1, wherein the nozzle is capable of being outfitted with a fixed bore nozzle or a variable discharge nozzle which is capable of being adjusted between a targeted spray and a wide area spray.

* * * * *